(12) United States Patent
Youchison et al.

(10) Patent No.: US 7,899,146 B1
(45) Date of Patent: Mar. 1, 2011

(54) POROUS NUCLEAR FUEL ELEMENT FOR HIGH-TEMPERATURE GAS-COOLED NUCLEAR REACTORS

(75) Inventors: Dennis L. Youchison, Albuquerque, NM (US); Brian E. Williams, Pacoima, CA (US); Robert E. Benander, Pacoima, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/881,873

(22) Filed: Jun. 29, 2004

(51) Int. Cl.
*G21C 3/62* (2006.01)
*A61M 36/14* (2006.01)

(52) U.S. Cl. .................. 376/222; 376/221; 376/414

(58) Field of Classification Search .............. 376/409, 376/412, 414, 221, 222
See application file for complete search history.

(56) References Cited

U.S. PATENT DOCUMENTS

| | | | |
|---|---|---|---|
| 3,799,882 A | 3/1974 | Holland | |
| 3,803,044 A * | 4/1974 | Carnall et al. | ............... 252/584 |
| 3,844,972 A | 10/1974 | Tully, Jr. et al. | |
| 3,945,629 A | 3/1976 | Ragone et al. | |
| 4,056,584 A | 11/1977 | Miertschin et al. | |
| 4,092,384 A | 5/1978 | Hrovat | |
| 4,367,184 A | 1/1983 | Stinton | |
| 4,560,621 A | 12/1985 | Landingham | |
| 4,759,911 A | 7/1988 | Bingham et al. | |
| 4,978,480 A | 12/1990 | Stansfield et al. | |
| 5,037,606 A | 8/1991 | DeVelasco et al. | |
| 5,061,436 A | 10/1991 | Coiner, Jr. | |
| 5,094,804 A | 3/1992 | Schweitzer | |
| 5,192,495 A * | 3/1993 | Caldwell et al. | ............ 376/417 |
| 5,320,786 A | 6/1994 | Matthews et al. | |
| 5,422,047 A * | 6/1995 | Naughton | ...................... 264/5 |
| 6,033,506 A | 3/2000 | Klett | |
| 6,037,032 A | 3/2000 | Klett et al. | |
| 6,599,490 B1 | 7/2003 | Mirsky et al. | |
| 2007/0172639 A1 | 7/2007 | Kmetz | |
| 2008/0003357 A1 | 1/2008 | Schmidt et al. | |

OTHER PUBLICATIONS

"Refractory Open-Cell Foam Fuel Matrix for High Efficiency Nuclear Space Propulsion Systems," Ultramet, Proposal to NASA, Sept. 5, 2002, http://www.spacepda.net/abstracts/02/sttr/020014.html (website accessed Aug. 29, 2005).*

(Continued)

*Primary Examiner* — Johannes P Mondt
(74) *Attorney, Agent, or Firm* — Robert D. Watson

(57) ABSTRACT

Porous nuclear fuel elements for use in advanced high temperature gas-cooled nuclear reactors (HTGR's), and to processes for fabricating them. Advanced uranium bi-carbide, uranium tri-carbide and uranium carbonitride nuclear fuels can be used. These fuels have high melting temperatures, high thermal conductivity, and high resistance to erosion by hot hydrogen gas. Tri-carbide fuels, such as (U,Zr,Nb)C, can be fabricated using chemical vapor infiltration (CVI) to simultaneously deposit each of the three separate carbides, e.g., UC, ZrC, and NbC in a single CVI step. By using CVI, the nuclear fuel may be deposited inside of a highly porous skeletal structure made of, for example, reticulated vitreous carbon foam.

8 Claims, 16 Drawing Sheets

OTHER PUBLICATIONS

"Uranium Tri-Carbide", INSPI, Sep. 14, 2003, http://www.inspi.ufl.edu/tricarbide.pdf (website accessed Aug. 29, 2005).*

Travis W. Knight & Samin Angaie; Processing and Fabrication of Mixed Uranium . . . ; Journal of Nuclear Materials; (2002) 54-60.

G. D. Alton, J.R. Beene & Y. Liu; Criteria for Selection of Target materials and Design of High-Efficiency-Release . . . ; Nuclear Instruments & Methods . . . ; 1999.

A.C. Marshall; A Review of Gas-Cooled Reactor Concepts for SDI Applications; Sandia Report, Sand87, Printed Aug. 1989.

Knight, Anghaie, Plancher & Gouw; Square Lattice Honeycomb tri-Carbide Fueled Reactor . . . ; Proceedings of ICAPP '03, Cordoba, Spain, May 4-7, 2003, Paper 3350.

Studart, et al., Processing Routes to Macroporous Ceramics: A Review, J. Am. Ceram. Soc., 89 [6] 1771-1789 (2006).

Green, et al., Cellular Ceramics: Intriguing Structures, Novel Properties, and Innovative Applications, MRS Bulletin, pp. 296-300, Apr. 2003.

Alton, et al., Criteria for selection of taret materials and design of high-efficiency-release targets . . . , Nuclear Instr. & Methods in Physics Research A 439 (1999) 190-209.

Ma, et al., From Carbon Nanobells to Nickel Nanotubes, Applied Physics Letters 94, 013109 (2009).

Colombo, et al., Ceramic Foams from Preceramic Polymers, Mat Res Innovat (2002) 6:20-272.

Appiah, et al., Effects of deposition temperature on microstructure of laminated (SiC-C) matrix composites, Jnl. Mat. Science 35 (2000) 1979-1984.

Fitzgerald, et al., Processing of microcellular SiC foams, Jnl. Mat. Science 30 (1995) 1037-1045.

Anup K. Bhattacharya, et al., Cellular SiC ceramic from stems of corn-processing and microstructure, J. Mater Sci 41 (2006) 2443-2448.

P. Sourdiaucourt, et al., Mechanical reinforcement of carbon foam by hafnium carbode deposit, J. Phys. IV France 9 (1999) 1187-1194.

Colombo, et al., Conventional and novel processing methods for cellular ceramics, Phil. Trans. R. Soc. A (2006) 364, 109-124.

Sheppard, et al., Properties and Characteristics of Graphite, Poco Graphite, Inc., Fifth Printing, Nov. 2001, www.poco.com.

Nangrejo, et al., Preparation of silicon carbide-silicon nitride comoposite foams from pre-ceramic polymers, Jnl. European Cer. Soc. 20 (2000) 1777-1785.

Alton, et al., A new method for infiltration coating complex geometry matrices . . . , Nuclear Instruments and methods in physics research A 521 (2004) 108-125.

* cited by examiner

Cell Structure

Window Diameter

Pore Diameter

PPI = Pores Per Inch

SEC A-A

SEC B-B

POROUS NUCLEAR FUEL ELEMENT FOR HIGH-TEMPERATURE GAS-COOLED NUCLEAR REACTORS

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to porous nuclear fuel elements for use in advanced high temperature gas-cooled nuclear reactors (HTGR's), and to methods for fabricating same.

Exploring the solar system while maintaining reasonable interplanetary travel times will require increases in spacecraft velocities of one to two orders of magnitude over currently achievable levels. The "packaged energy" for space propulsion systems required to achieve this goal, expressed as a combination of specific impulse ($I_{sp}$) and mass fraction, must increase by an order of magnitude over current chemical rocket propulsion. The primary problem is that even advanced chemical rocket systems limit maneuverability and destinations. Chemical systems will not be able to extend human space exploration much beyond the moon or Mars. One solution to this problem is to utilize more energetic fuels. Therefore, NASA's goal is to develop fission propulsion to enable rapid and affordable access to any point in the solar system.

Fission power enables a new propulsion growth path with two options: nuclear thermal propulsion (NTP), in which gas is heated and expanded through a nozzle; or nuclear electric propulsion (NEP), in which nuclear power is converted to electric power for an advanced propulsion system, such as a plasma thruster. The $I_{sp}$ for NTP systems can increase by a factor of 10 to 100, and the specific energy can improve by a factor of 1,000,000 over conventional rockets. NTP systems have high thrust with moderate $I_{sp}$ (>800 sec), whereas NEP systems have lower thrust with extended $I_{sp}$ (>5000 sec) while providing auxiliary payload power. When compared to chemical power, fission power provides more energy for instruments, communications and higher data processing rates; more time for extended exploration; and more adaptability to changing mission requirements.

Recent conceptual designs, e.g., SAFE-100 and SAFE-300, are based on using uranium oxide ($UO_2$) nuclear fuel elements. A 30-kW resistively heated prototype module, SAFE-30, underwent testing to verify heat transfer through an annular core geometry utilizing heat pipes and a 350-W Stirling engine power converter. Such designs clearly have potential for lower thrust, long-$I_{sp}$ NEP systems, but are limited by their maximum operating temperature when high-thrust, shorter-pulse NTP systems or bimodal NTP/NEP systems would best meet mission requirements.

The efficiency of the rocket increases if the temperature difference $\Delta T$ between the fuel and propellant is minimized. This dramatically improves thrust-to-mass ratio, reduces the amount of propellant required (tankage) for NTP systems, and can improve total available electric power for NEP systems when using a high-efficiency Brayton thermal cycle or advanced Stirling engine. Current designs for high-temperature gas-cooled reactor fuel elements, such as annual rods or pebble beds, cannot operate at extremely high temperatures and, thus, have limited efficiency.

U.S. Pat. No. 5,094,804 to Schweitzer and U.S. Pat. No. 4,659,911 to Bingham et al. are representative of older types of nuclear fuel elements.

Helium gas-cooled reactors have been operated in the USA using pebble-bed core designs with spherical fuel elements (60 mm diameter "pebbles") made of TRISO fuel particles embedded in a graphite matrix. Each TRISO fuel particle is a microsphere (0.9 mm diameter) comprising a kernal/core of fissile material ($UO_2$ or $UC_2$) coated by multiple layers of protective barrier materials, e.g., a porous carbon buffer layer, followed by pyrocarbon, followed by silicon carbide, followed by an external coating of pyrocarbon. A typical reactor core might contain 11,000 fuel pebbles.

A new project, Prometheus, will enable advanced human exploration of the solar system, including Mars, and beyond. It specifically calls for the development of new nuclear fuels and components that are capable of extremely high temperature and very efficient operation (>925 sec $I_{sp}$ for >1 hr). An attractive approach would be to use high-efficiency, gas-permeable, porous nuclear fuel elements for high-temperature, gas-cooled (e.g., hydrogen, helium) space reactors. The porous fuel elements can operate at extremely high temperatures when using refractory materials with low neutron absorption cross-sections, and can have much higher heat transfer coefficients due to their very large surface-to-volume ratio and extended surface areas for transferring heat, which allows for greater power densities. The interior surfaces of the porous body could be coated with a thin layer of the nuclear fuel, so that the (hot) hydrogen or helium gas would easily flow through the interconnected open porosity to efficiently exchange heat generated by the nuclear fuel to the gas coolant. Such a porous nuclear fuel element incorporating an enriched uranium (or plutonium, thorium, americium) bi- or tri-carbide fuel could have extremely high surface area and stiffness, low density (light-weight), extremely high melting point and excellent thermal conductivity; would not degrade in hydrogen at 3000 K, would not clog; and would retain its structural integrity at high temperatures. The dispersed fissile material could be an integral part of a high-conductivity matrix. Thus, a greatly reduced temperature difference between the center of the fuel and the gas coolant (i.e., propellant) temperature could exist, which would allow the gas temperature to be much higher, yielding the high specific impulse required to sustain interplanetary exploration.

Highly porous (e.g., 90% porous) metal carbide foam structures (without nuclear fuel) have been successfully fabricated in the aerospace industry by Ultramet, Inc. through chemical vapor deposition of one or more layers of a refractory metal carbide, for example, ZrC or NbC, on a porous foam skeleton made of, for example, reticulated vitreous carbon (RVC). These metal carbide foams have been used as thermal protection systems, actively cooled structures/heat exchangers, flash and blast suppressors, and lightweight mirror substrates. The interconnected open cell geometry and tortuous flow path provides excellent, heat exchange properties, excellent particulate filtration, with a correspondingly low mass. Just about any material that can be deposited by CVD/CVI techniques can be used to make a porous structure by depositing them onto a skeletal structure (e.g., RVC foam). Examples of suitable materials that can be deposited by CVD/CVI include, but are not limited to: Zr, Nb, Mo, Hf, Ta, W, Re, TiC, TaC, ZrC, SiC, HfC, $BeC_2$, $B_4C$, NbC, GdC, $HfB_2$, $ZrB_2$, $Si_3N_4$, $TiO_2$, BeO, $SiO_2$, $ZrO_2$, $HfO_2$, $Y_2O_3$, $Al_2O_3$, $Sc_2O_3$, and $Ta_2O_5$. Foam structures made of NbC and/or ZrC deposited on a RVC matrix) have several important advantages over bulk high temperature materials, such as low overall density, lack of degradation in hot hydrogen at 2700 C (where they also retain structural integrity), and minimal neutron cross-section (i.e., reduced parasitic neutron absorbtion).

Solid solution, mixed carbide fuels, such as uranium carbide (UC, $UC_2$) and uranium bi-carbide fuels (U,Zr)C were studied in the 1970's for nuclear thermal propulsion of spacecraft as part of the Rover/NERVA program in the USA, and in similar programs in the former Soviet Union. Fuel elements designs included dispersions of small particles of $UO_2$ or $UC_2$ in solid graphite blocks; and a composite design made of solid-solution (U,Zr)C dispersed inside of graphite. Both fuel types were protected by a NbC or ZrC fission product barrier coating. These protective coatings were needed to protect against unacceptable mass loss due to the high chemical reactivity of free carbon with the flowing hot hydrogen propellant; and due to mis-matches in thermal expansion coefficient between the graphite matrix and the NbC or ZrC coatings. At the time the program was cancelled in 1973, there had been an evolution in thinking towards considering an all-carbide, solid-solution uranium bi-carbide fuel, e.g., (U,Zr)C or (U,Nb)C, because of their expected high resistance to erosion from exposure to hot hydrogen gas. However, the uranium bi-carbide fuels were never infiltrated into a porous matrix structure to make a porous fuel element. In addition, single-phase, solid-solution uranium tri-carbide fuels, such as (U,Zr,Nb)C, were never seriously considered because they had not been synthesized or fabricated at that point in time. It has only been in recent years that uranium tri-carbide fuels have been successfully fabricated, and their basic properties measured.

Advanced uranium (or plutonium) tri-carbide fuels have been proposed for nuclear thermal propulsion (NTP) applications because of their expected longer life and higher operating temperature; due to their high melting temperature, high thermal conductivity, and improved resistance to hot hydrogen corrosion. Recently, high density (e.g., 95%), solid solution mixed uranium/refractory metal tri-carbide fuels have been manufactured using a high-temperature liquid-phase sintering technique developed at the University of Florida (see T. W. Knight & A. Anghaie, "Processing and fabrication of mixed uranium/refractory metal carbide fuels with liquid-phase sintering", *Journal of Nuclear Materials* 306 (2002) p. 54-60.)

These uranium tri-carbide fuels, such as (U, Zr, X) C with X=Nb, Ta, Hf, or W, exhibit high melting temperatures (greater than 3400 C) for uranium metal mole fractions of 10% or less. This melting point is almost 1000 C higher than pure UC; and $UC_2$ has an even lower melting point. Also, $UC_2$ erodes much more quickly in hot hydrogen than UC. Mixed phases of UC and $UC_2$ lead to eutectic melting at a temperature 500 C lower than UC. For the tri-carbide fuels, uranium fractions greater than 10% lower the melting temperature and lead to greater uranium mass loss from either interactions with the flowing hot hydrogen propellant or vaporization from the fuel element surface, especially near the bottom of the reactor core where fuel surface and hydrogen exit temperatures might be expected to exceed 2500 C. The high solid-phase solubility of UC with the refractory metal carbides (ZrC, NbC, TaC, etc.) permits a large degree of flexibility in designing uranium bi-carbide or tri-carbide nuclear fuel elements. The carbon-to-metal (C/M) ratio can be less than 0.95 in order to maintain high melting point. When the uranium concentration is less than about 10% mole fraction, then the melting point of the tri-carbide can be as high as 3400 C for a solid solution.

Hydrogen testing on these solid solution uranium tri-carbide alloy fuels has been performed, with little erosion observed at 2700-2800 C. Additionally, the thermal conductivities of these solid-solution uranium tri-carbide fuels is much higher than conventional uranium oxide nuclear fuels (by factors of 10-20 times higher). These superior physical properties improves overall reactor efficiency and reduces system cost by allowing higher operating temperatures, reducing the amount of nuclear fuel (owing to small, more compact cores), and reducing propellant requirements (including reduced refrigeration costs). Hence, solid solution uranium tri-carbide fuels are preferred over uranium single-carbide and bi-carbide fuels.

Unfortunately, the method of fabrication described above for producing these advanced uranium tri-carbide fuels (i.e., liquid-phase sintering), cannot be used to deposit thin coatings of nuclear fuel onto exposed interior surfaces of a highly porous foam skeleton made of, e.g., reticulated vitreous or glassy carbon. The sintering step would quickly destroy the thin, interconnected structural ligaments. Therefore, the previous process of liquid-phase sintering cannot be used to make a porous, gas-permeable fuel element made of uranium tri-carbide fuel.

What is needed, then, is a high-efficiency, gas-permeable, porous nuclear fuel element for use in high temperature gas-cooled nuclear reactors (HTGR's), and a process for fabricating them, which utilizes advanced uranium bi-carbide, uranium tri-carbide, and uranium carbonitride nuclear fuels having higher melting temperatures, higher thermal conductivity, and improved resistance to corrosion from hot hydrogen gas.

Against this background, the present invention was developed.

SUMMARY OF THE INVENTION

The present invention relates to porous nuclear fuel elements for use in advanced high temperature gas-cooled nuclear reactors (HTGR's), and to processes for fabricating them. Advanced uranium bi-carbide, uranium tri-carbide and uranium carbonitride nuclear fuels can be used. These fuels have high melting temperatures, high thermal conductivity, and high resistance to erosion by hot hydrogen gas. Tri-carbide fuels, such as (U,Zr,Nb)C, can be fabricated using chemical vapor infiltration (CVI) to simultaneously deposit each of the three separate carbides, e.g., UC, ZrC, and NbC in a single CVI step. The nuclear fuel may be deposited using CVI inside of a highly porous skeletal structure made of, for example, a reticulated vitreous carbon foam.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Herein, when we refer to a tri-carbide nuclear fuel, e.g., (U,Zr,Nb)C, we broadly define this to include hyper- and hypo-stoichimetric compositions, such as $(U_{0.1}\,Zr_{0.77}\,Nb_{0.13})\,C_{0.95}$, in addition to stoichimetric compositions. Additionally, when we refer to uranium, we broadly define this as including any fissile element, including enriched uranium, americium, plutonium, and mixtures thereof, unless otherwise specifically stated.

Figure 1:
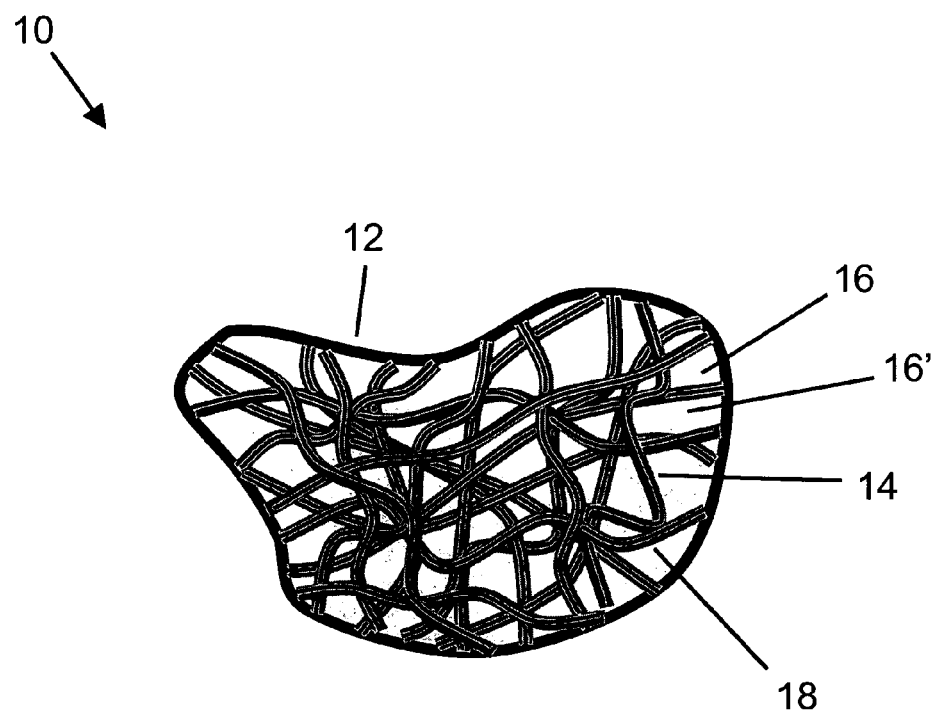
FIG. 1 illustrates a schematic side view of an example of a porous nuclear fuel element, according to the present invention.

FIG. 1 illustrates a schematic side view of an example of a porous nuclear fuel element, according to the present invention. Fuel element 10 comprises a porous body 12 comprising internal structure 14 and interconnected pores 16, 16', etc. In this example, internal structure 14 is illustrated as a fibrous body comprising a tangled web or woven mesh of fibers or ligaments. Nuclear fuel 18 is disposed on the external surfaces of internal structure 14. Fuel 18 comprises one or more alloys selected from the group consisting of solid solution uranium bi-carbides, solid solution uranium tri-carbides, and solid solution uranium carbonitrides. The solid solution uranium bi-carbides may comprise (U,Zr)C or (U,Nb)C, or combinations thereof. The solid solution uranium tri-carbides may comprise (U,Zr,Nb)C, (U,Zr,Ta)C, (U,Zr,Hf)C, or (U,Zr,W)C, or combinations thereof. The solid solution uranium carbonitrides may comprise (U,Zr)CN or (U,Ta)CN, or combinations thereof. Nuclear, fuel 18 may comprise uranium tri-carbide, $(U_W Zr_X Nb_Y)C_Z$, where $0.04<W<0.12$, $0.45<X<0.9$, $0<Y<0.45$, and $0.92<Z<1.0$. Alternatively, nuclear fuel 18 may comprise uranium tri-carbide nuclear fuel having a stoichiometry of about $(U_{0.1}\,Zr_{0.77}\,Nb_{0.13})C_{0.95}$. Alternatively, nuclear fuel 18 may comprise uranium tri-carbide nuclear fuel having a stoichiometry of about $(U_{0.1}\,Zr_{0.675}\,Nb_{0.225})C$. Nuclear fuel 18 may comprise a thin coating fabricated by simultaneously vapor depositing all of the elements that make up the layer. For example, a solid solution uranium tri-carbide layer may be fabricated by simultaneously CVI depositing the three separate carbides UC, NbC, and ZrC at the same time (i.e., "vapor phase alloying"). The solid solution uranium tri-carbide layer 18 formed in this way is a true single-phase alloy of the three individual carbides, intimately mixed at the molecular scale.

Nuclear fuel element 10, including internal structure 14 coated by nuclear fuel 18, may have a total porosity greater than about 70%. Alternatively, the total porosity may be greater than about 70% and less than about 90%. Alternatively, the total porosity may be greater than about 77% and less than about 85%. One example of an optimum total porosity is about 77%, which provides a good balance between heat transfer and pressure drop. This optimum design provides just enough fissile material to be critical, without resorting to excessively large reactor sizes or using weapon's grade enrichments. The fuel matrix is adaptable to both thermal and fast reactors by inclusion or deletion of moderator material (e.g. ZrH or C). Having a thin thickness of the nuclear fuel allows for a high total porosity to maintain the heat transfer efficiency and to keep the temperature difference between the ligament (fuel) centerline and the coolant (e.g., helium or hydrogen) bulk temperature as low as possible.

Figure 2A:
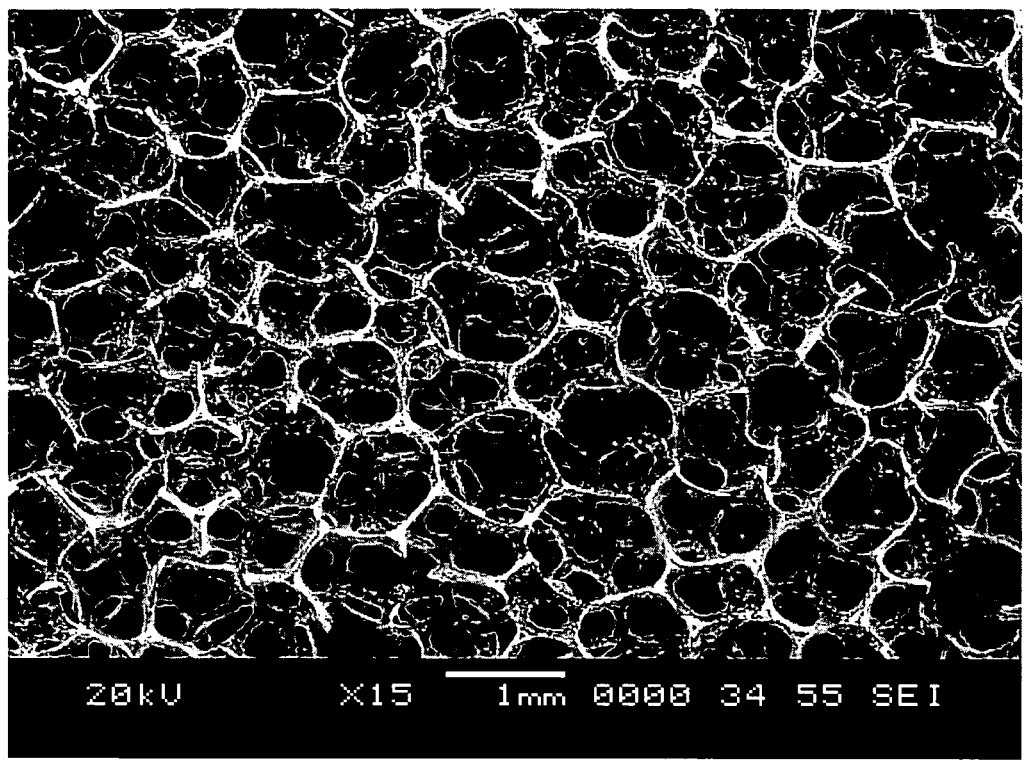
FIG. 2A is a SEM micrograph magnified 15× of a 65-ppi reticulated vitreous carbon (RVC) foam skeleton before being infiltrated with nuclear fuel. The average pore diameter is about 800 microns and the total porosity is about 97%.

FIG. 2A is a SEM micrograph magnified 15× of a 65-ppi reticulated vitreous carbon (RVC) foam skeleton before being infiltrated with nuclear fuel. The average pore diameter is about 800 microns and the total porosity is about 97%.

Figure 2B:
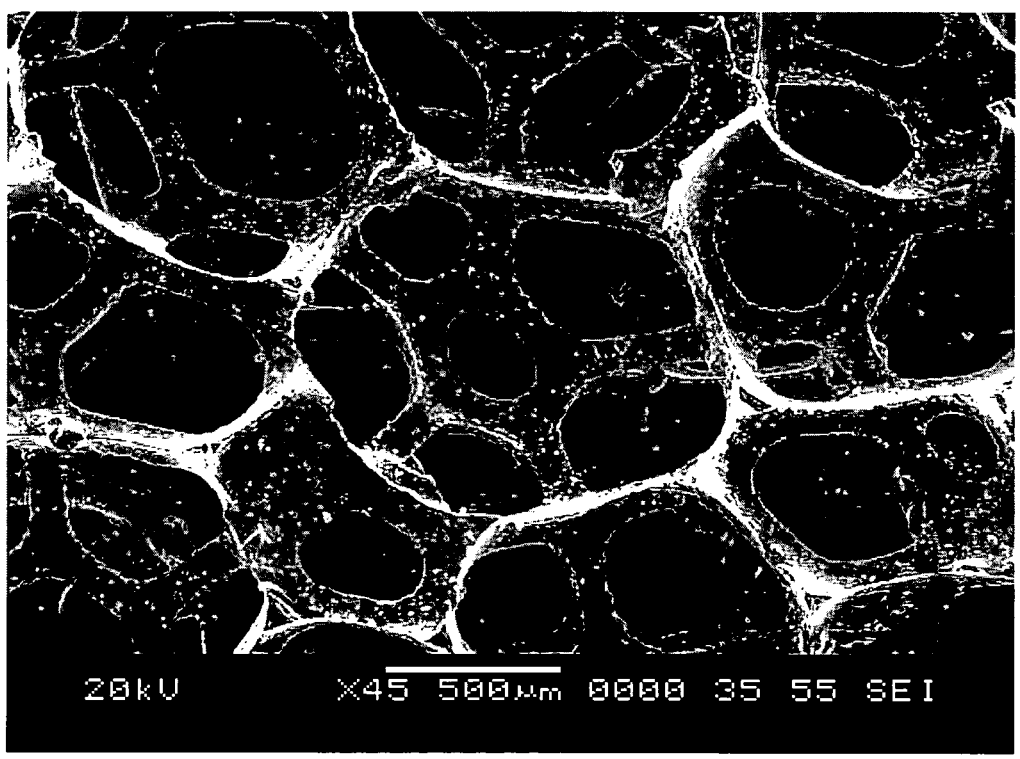
FIG. 2B is a SEM micrograph magnified 45× of a 65-ppi reticulated vitreous carbon (RVC) foam skeleton before being infiltrated with nuclear fuel. The average pore diameter is about 800 microns and the total porosity is about 97%.

FIG. 2B is a SEM micrograph magnified 45× of a 65-ppi reticulated vitreous carbon (RVC) foam skeleton before being infiltrated with nuclear fuel. The average pore diameter is about 800 microns and the total porosity is about 97%.

Figure 2C:
FIG. 2C are SEM micrographs of a reticulated vitreous carbon (RVC) foam skeleton, illustrating the meanings of "cell structure", "window diameter", "pore diameter", and "pores-per-inch (PPI)".
Figure 2C:
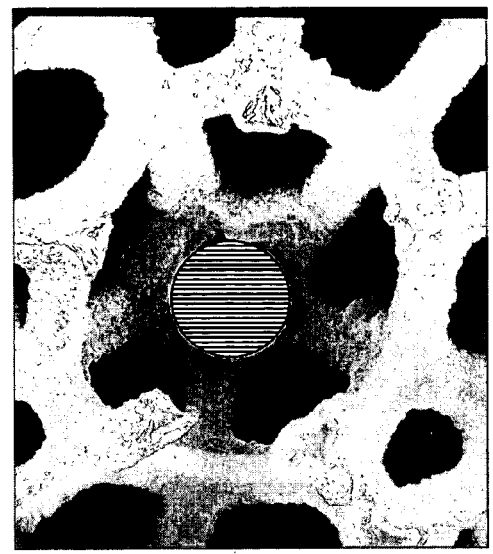
Figure 2C:
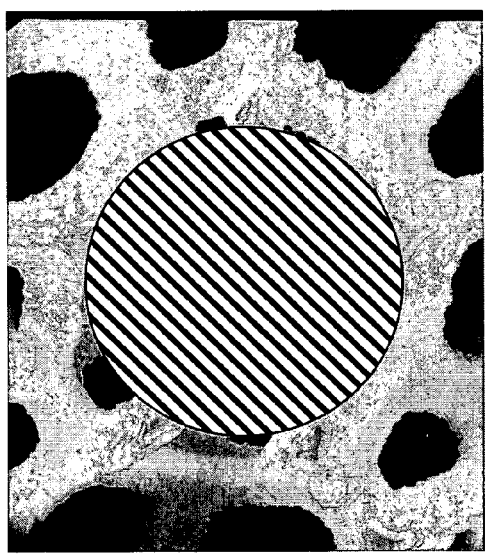
Figure 2C:
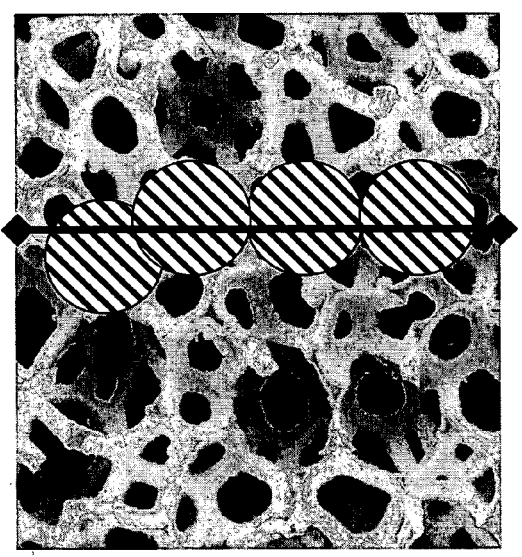

FIG. 2C are SEM micrographs of a reticulated vitreous carbon (RVC) foam skeleton, illustrating the meanings of "cell structure", "window diameter", "pore diameter", and "pores-per-inch (PPI)". For example, the window diameter of the RVC foam skeleton in FIGS. 2A and 2B is about 250 microns; the average ligament thickness is about 75 microns, with a triangular cross-section; and a specific surface area of about 3700 $m^2/m^3$ at 97% porosity. Essentially 100% of the porosity in this sample (and for RVC foams in general) comprises interconnected pores.

A first example of a process for making a metal or ceramic coated RVC foam is as follows. First, commercially available polyurethane foam is purchased in the desired pore size. Then, the polyurethane foam is infiltrated with a carbon-bearing resin and pyrolyzed to form a porous, open-celled material composed essentially of vitreous (glassy) carbon, which is called a reticulated vitreous carbon (RVC) foam skeleton. Some shrinkage occurs at this step, but the original pore structure of the polyurethane foam is retained during conversion to RVC. The RVC foam has an extremely high void volume (97%), combined with self-supporting rigidity. Pore densities from 3 to 100 pores per linear inch (ppi) are readily available, and higher ppi foams can be made by compressing 100-ppi material prior to pyrolysis in one, two, or three dimensions (see, for example, FIG. 6). Compression or stretching can also be used to create directional properties (e.g., strength, pressure drop, etc.). Additionally, the RVC foam skeleton can be machined to near final dimensions prior to vapor infiltration.

High ppi (i.e., hundreds of ppi) compressed carbon foam may be used as the skeletal structure as a means of increasing the surface area and heat transfer of the nuclear fuel. 65 ppi foam was selected for initial development, but foams up to 130 ppi are readily produced through resin infiltration of pyrolysis of polyurethane foam, yield vitreous carbon. By compression of foam prior to the conversion to carbon, foams in excess of 1000 ppi have been fabricated. Compressed foams may be anisotropic structures with directional fluid flow, thermal, and mechanical properties, which may be tailored.

Then, the RVC foam is infiltrated with the desired nuclear fuel to the desired overall density by using chemical vapor infiltration (CVI), or some other vapor, liquid, or physical deposition process. Typical infiltration levels, depending on the application, fall in the 10-30 vol % range (added to the 3 vol % dense RVC skeleton). At this stage, the thermal and mechanical properties of the foam are mostly dictated by the infiltrated material. The original RVC foam skeleton has little influence on the final foam properties, and can often be removed through reaction with hydrogen or oxygen, depending on the particular material that was infiltrated.

Chemical vapor infiltration (CVI), a variation of the chemical vapor deposition (CVD) process, is used primarily for depositing material inside of the porous foam, felt, mesh, or fibrous preform. The vapor deposition process is an extremely versatile and relatively inexpensive method of molecular-forming materials that are difficult to machine or otherwise produce by conventional processes. CVI relies on the decomposition of a gaseous precursor, flowed over (in the case of CVD), or through (in the case of CVI) a heated substrate, with subsequent condensation from the vapor state to form a solid deposit on the substrate. Benefits of CVD/CVI include the ability to produce deposits of controlled density, thickness, orientation, and composition. Impurity levels are typically less than 0.1%, with densities up to 99.9% being achievable. In addition, CVD/CVI coating processes exhibit the greatest throwing power, or ability to uniformly deposit on intricately shaped or textured substrates. Vapor deposition of ceramic materials inside of porous substrates possesses distinct advantages over other methods, such as slurry impregnation, in that precise control of coating thickness, homogeneity, and density can be achieved using CVI.

Perhaps the greatest benefit of CVD/CVI is that a wide variety of materials can be deposited at temperatures that are 10% to 50% of the melting point of the coating material itself, which eliminates the need to perform liquid-phase infiltration at high temperatures. In preparation for infiltration, the RVC foam substrate/skeleton can easily be machined to near final dimensions, while accounting for minor dimensional changes that occur during infiltration.

In the CVI process, reactant gases (typically metal chlorides or fluorides containing the desired coating material(s)) are flowed through a heated substrate (e.g., RVC foam). The compound(s) within the reactant gas stream react near the heated ligament surfaces to form a continuous, uniform coating. For example, NbC is deposited at 1000-1200° C. via reaction of niobium pentachloride ($NbCl_5$) with methane ($CH_4$) and hydrogen ($H_2$) as follows:

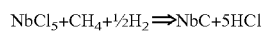

$$NbCl_5 + CH_4 + \tfrac{1}{2}H_2 \Rightarrow NbC + 5HCl$$

Coatings of ZrC, TaC or UC can be deposited by analogous reactions. The primary process variables that must be optimized are temperature, pressure, reactant concentration and flow rate, and deposition time. Using CVI, multiple materials may be deposited simultaneously in a well-mixed state as a single deposit. Optionally, after CVI infiltration, exposure to high temperature hydrogen may be used to remove the underlying RVC foam skeleton, and any free carbon in the deposited coating. Removal of the underlying skeleton using hydrogen or oxygen has virtually no impact on the mechanical performance of the foam, since the properties are primarily determined by the stiff metal carbide coating.

In the chemical vapor infiltration (CVI) process for a single metal carbide, the appropriate metal in pellet form is first chlorinated and then flowed over a heated substrate. Hydrogen and a carbon source are added to the system. Through a combination of thermal decomposition and chemical reaction, the carbide deposits on the heated substrate surface, while HCl gas is removed from the reaction chamber by a vacuum system. Deposition of more than one metal carbide simultaneously is more complicated because the metal chlorides must be well mixed and in the desired ratio in order to form a coating of the desired composition and homogeneity. For the case of the simultaneous deposition of UC, NbC, and ZrC in the present invention, one approach is to chlorinate each metal separately and then mix the gases together prior to reaching the heated substrate. This approach requires independent control of three separate chlorine sources to uniformly mix the three chlorides.

An alternate approach is to fabricate a pellet containing all of the three metals mechanically mixed together. In this case, fine powders (e.g., −325 mesh powders, 0.0017" diameter) are mechanically mixed in an appropriate weight ratio, e.g. 10% U:45% Zr:45% Nb and then mechanically pressed under high pressure to create a pellet, e.g., a cylindrical pellet 0.5" dia.×0.25" long. The "mechanically alloyed" pressed pellet containing the three metals is then used in the CVI process described above.

A third approach is to manufacture a homogenous pellet that is a true metallurgical alloy of the three metals. This can be done by, for example, by liquid-phase sintering at very high temperatures. A eutectic alloy of the two or three-carbide alloys can be produced this way.

In general, fine-grained, fully dense coatings deposited by CVD have better stiffness and strength than do bulk materials having the same composition fabricated by powder processing. The elastic moduli of such CVD films have regularly measured up to 25% higher than those of the bulk materials. RVC foam is extremely well-suited as a lightweight substrate onto which very high-stiffness coatings may be deposited/infiltrated by CVD/CVI. Since the modulus of the deposited film is so much greater than that of the vitreous carbon foam skeleton, the carbon foam has essentially no influence on the properties of the final product; it merely acts as a "locator" for the deposited films. Ceramic foams fabricated via CVI exhibit significantly greater thermal and mechanical fracture toughness than do monolithic ceramics since the ligamental structure severely inhibits crack propagation.

Optionally, a protective coating, e.g. ZrC, may be vapor deposited on top of the layer(s) of nuclear fuel as an additional moderator or encapsulation barrier. The protective coating can contribute significantly to the overall porous body's strength.

Other coating techniques may be used to deposit the nuclear fuel and refractory metal carbides or carbonitrides, including chemical reaction deposition (CRD), physical vapor deposition (PVD), electrolytic deposition (ED), cathophoresis deposition (CD), electrophoresis deposition (ED), and sol-gel coating (SGC), and a liquid "painting" technique that uses vacuum infiltration to draw a suspension of fine powder in a liquid binder into the porous body, followed by baking to drive off the liquid binder. Also, a "melt-infiltration" process may be used as a method of introducing the desired metals into the foam structure and coating the ligaments, followed by conversion to a tricarbide form. Also, the fuel material may be "cast" into a thermally/structurally stable foam material.

Figure 3:
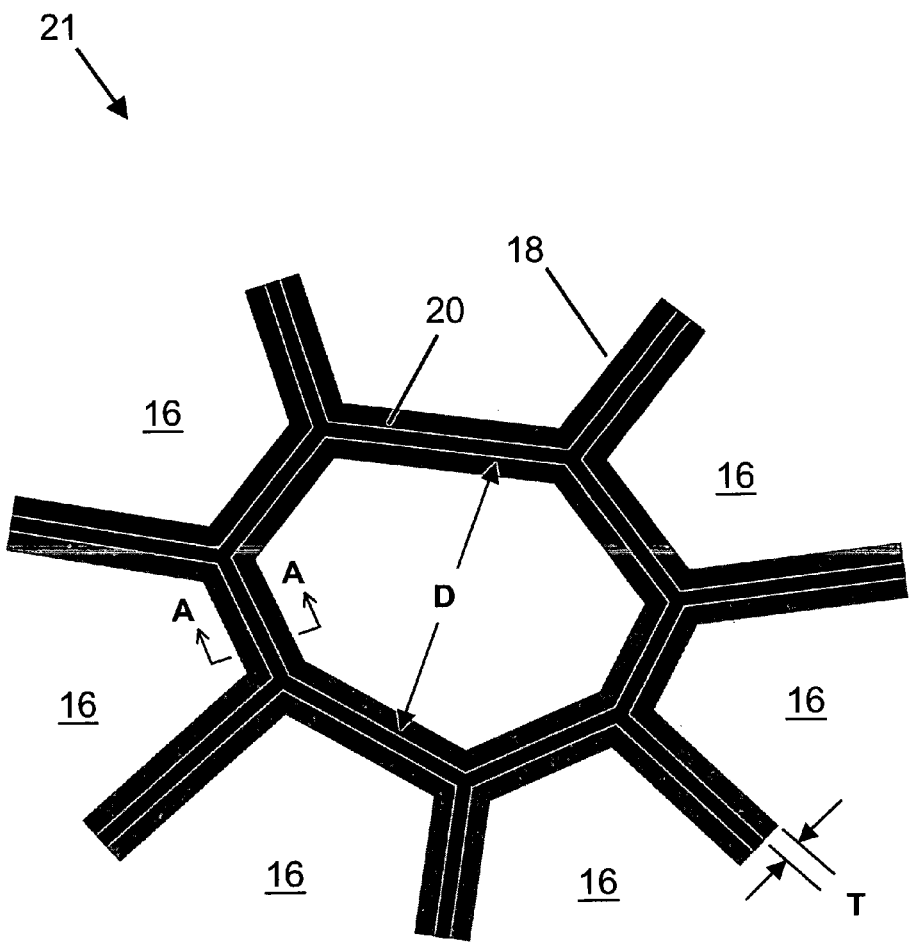
FIG. 3 illustrates a schematic view of an example of a porous body with internal structure coated by nuclear fuel, according to the present invention.

FIG. 3 illustrates a schematic view of an example of a porous body with internal structure coated by nuclear fuel, according to the present invention. Porous body 21 comprises interconnected ligaments 20, and interconnected pores 16. Ligaments 20 are coated with nuclear fuel 18, which may be a continuous or discontinuous coating. Optionally, the thickness, T, of the coating of nuclear fuel 18 may be less than or equal to about 10% to 20% of the diameter, D, of pore 16. For example, if the pore diameter=800 microns, then the thickness of the coating of nuclear fuel may be less than or equal to 80-160 microns. Alternatively, the thickness of the coating of nuclear fuel 18 may be less than or equal to 50 microns.

The internal structure (e.g., ligaments/fibers 20) of porous body 21 may comprise one or more materials selected from the group consisting of carbon, graphite, Zr, Nb, Mo, Hf, Ta, W, Re, TiC, TaC, ZrC, SiC, HfC, $BeC_2$, $B_4C$, NbC, GdC, $HfB_2$, $ZrB_2$, $Si_3N_4$, $TiO_2$, BeO, $SiO_2$, $ZrO_2$, $HfO_2$, $Y_2O_3$, $Al_2O_3$, $Sc_2O_3$, and $Ta_2O_5$. Alternatively, the internal structure (e.g., ligaments/fibers 20) may comprise an open-celled foam structure/skeleton comprising a carbon-bearing material selected from the group consisting of carbon bonded carbon fiber (CBCF) foam, reticulated vitreous carbon (RVC) foam, pitch derived carbon foam (PDCF), and graphite foam.

Figure 4:
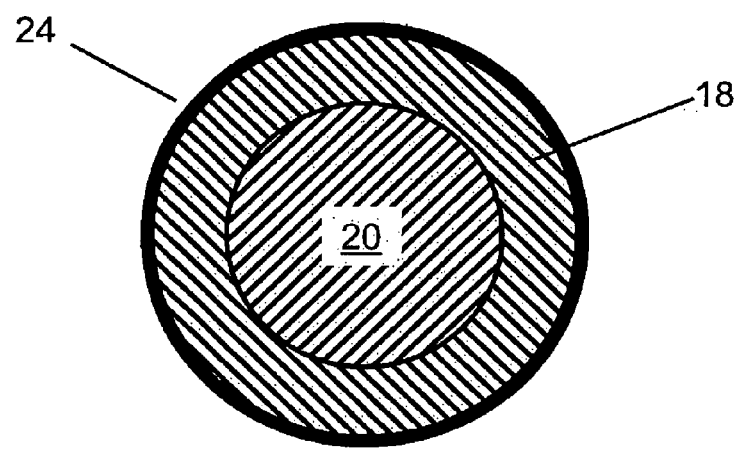
FIG. 4 illustrates a schematic cross-section view, Section A-A, of an example of a ligament of a porous body coated with nuclear fuel and an Outer barrier coating, according to the present invention.

FIG. 4 illustrates a schematic cross-section view, Section A-A, of the example of FIG. 3 of a ligament 20 of a porous body coated with nuclear fuel 18 and an outer barrier coating 24, according to the present invention. Ligament 20 may have a circular cross-section, and is coated with a single layer of nuclear fuel 18. Fuel layer 18 is overcoated with barrier coating 24. Barrier coating 24 protects the underlying nuclear fuel layer 22 from exposure to hot hydrogen gases, and can serve as a barrier to prevent migration of fission products, especially fission product gases, from leaving fuel layer 18 and migrating into the gas coolant stream. Barrier coating 24 may comprise one or more materials selected from the group consisting of NbC, ZrC, BeO, $BeC_2$, $ZrC_2$, SiC, pyrolytic carbon, diamond, and diamond-like carbon. Barrier coating 24 may have a thickness of about 25 microns.

Figure 5:
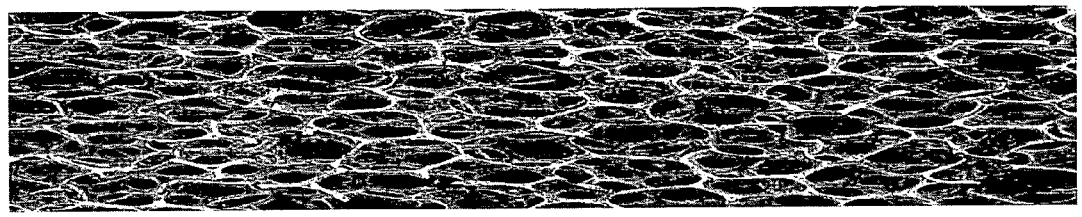
FIG. 5 illustrates a schematic cross-section view, Section A-A, of an example of a ligament of a porous body, with the ligament coated by a layer of nuclear fuel and two layers refractory metal carbides, according to the present invention.

FIG. 5 illustrates a schematic cross-section view, Section A-A, of an example of a hollow ligament 20 of a porous body, coated by a layer of nuclear fuel 18 and protective coating 24, according to the present invention.

Figure 6:
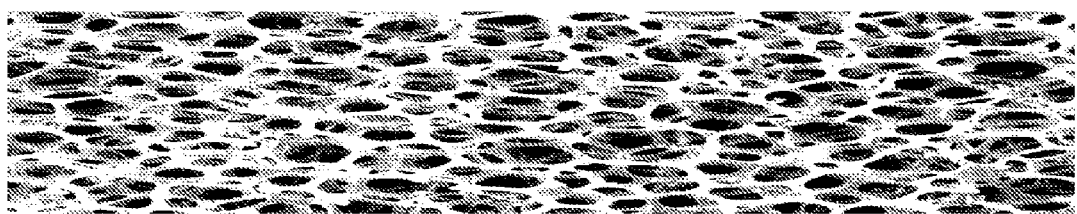
FIG. 6 is a SEM micrograph magnified 15× of a 65-ppi reticulated vitreous carbon (RVC) foam skeleton before being infiltrated with nuclear fuel. The RVC skeleton has been compressed in one direction to create elongated pores aligned along an axis.

FIG. 6 is a SEM micrograph magnified 15× of a 65-ppi reticulated vitreous carbon (RVC) foam skeleton before being infiltrated with nuclear fuel. The RVC skeleton has been compressed in one direction to create elongated pores aligned along an axis.

Figure 7A:
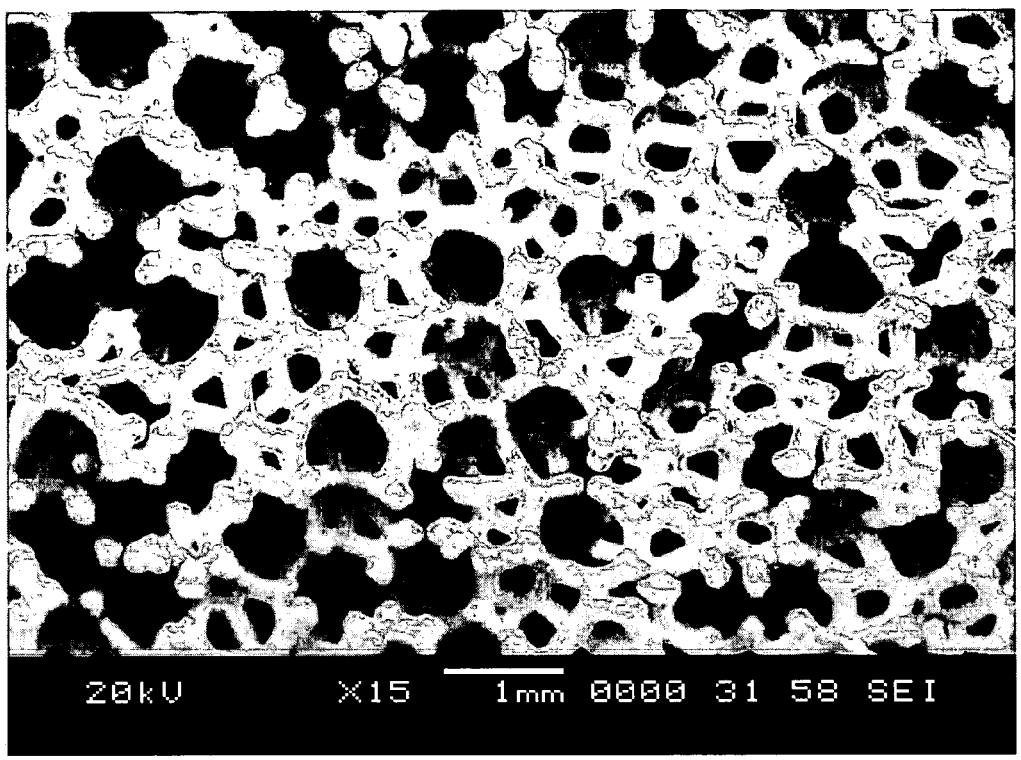
FIG. 7A is a SEM micrograph magnified 15× of a 65-ppi reticulated vitreous carbon (RVC) foam skeleton after infiltration with TaC—NbC—ZrC.

FIG. 7A is a SEM micrograph magnified 15× of a 65-ppi reticulated vitreous carbon (RVC) foam skeleton after infiltration with TaC—NbC—ZrC. TaC was used in this sample as a substitute for UC.

Figure 7B:
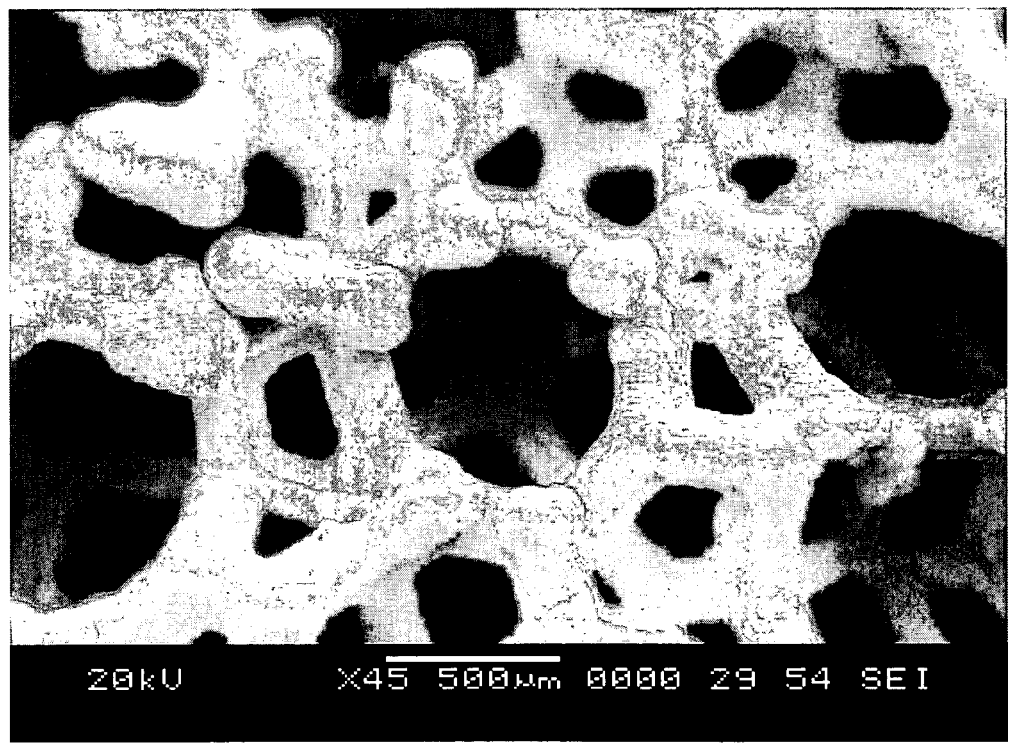
FIG. 7B is a SEM micrograph magnified 45× of a 65-ppi reticulated vitreous carbon (RVC) foam skeleton after infiltration with TaC—NbC—ZrC.

FIG. 7B is a SEM micrograph magnified 45× of a 65-ppi reticulated vitreous carbon (RVC) foam skeleton after infiltration with TaC—NbC—ZrC. TaC was used in this sample as a substitute for UC. The test samples shown in FIGS. 7A and 7B were made using a mechanically alloyed, pressed pellet having the following metal ratios: 41% Zr:41% Nb:18% Ta. Then, a RVC foam skeleton was infiltrated with the tri-carbide coating (Zr, Nb, Ta)C using CVI with these pressed pellets. The results are shown in FIGS. 7A and 7B. As can be seen, the uniformity of the tri-carbide coating (Zr, Nb, Ta)C is good. Samples were cross-sectioned and polished and examined under optical microscope at 100× and 150×. The mixed tri-carbide coating was seen to be fully dense, with no significant porosity, and exhibited a columnar microstructure. Energy-dispersive Z-ray spectroscopy (EDS) was performed on coated graphite and foam structures, and the phases present were determined by X-ray diffraction (XRD). The analysis showed that is was feasible to simultaneously deposit the three carbides, creating a homogeneous solid solution alloy by building at the molecular level, and to infiltrate the material into a foam structure. The XRD analysis confirmed full carburization of the three metals, with no residual elemental metal remaining. The infiltrated material was nominally 5 vol % tri-carbide coating and 3 vol % RVC foam skeleton core, giving a total open porosity of 92% for the entire fuel element (with no closed porosity).

However, although tri-carbide compositions in the range of the target were established in these examples, the composition was inconsistent in-between infiltration runs because of the mechanically pressed pellet feed material. As discussed previously, the pellets contained separate phases of the three metal materials. During the chlorination process, the three metals react with chlorine at slightly different rates and, hence, the uniformity of mixing of the metals within individual pellets was imperfect. This lead to varying concentration of the three metal carbides depositing on heated substrates from pellet to pellet. However, as stated earlier, these inconsistencies can be eliminated by metallurgically alloying the three metals into a homogenous pellet, for example, by liquid-phase sintering at very high temperatures.

Figure 8A:
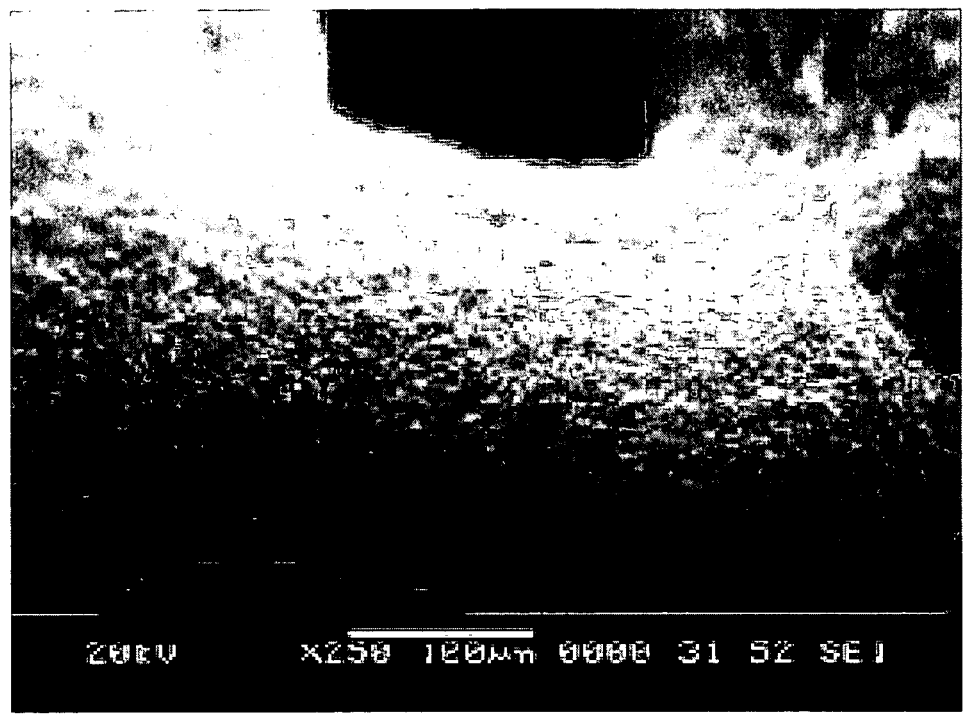
FIG. 8A is a SEM micrograph magnified 250× of a 65-ppi reticulated vitreous carbon (RVC) foam skeleton after infiltration with individual layers of TaC/NbC/ZrC. The outer surface of ZrC appears to be continuous and crack-free.

FIG. 8A is a SEM micrograph magnified 250× of a 65-ppi reticulated vitreous carbon (RVC) foam skeleton after infiltration with individual layers of TaC/NbC/ZrC. The outer surface of ZrC appears to be continuous and crack-free. TaC was used in this sample as a substitute for UC.

Figure 8C:
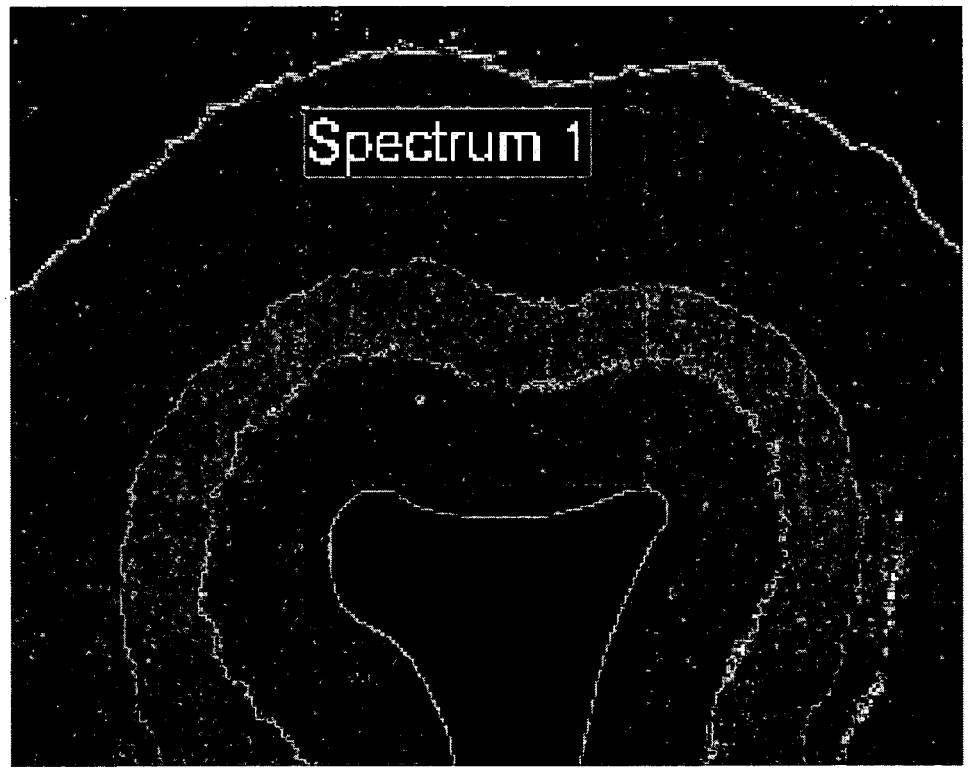
FIG. 8C is a SEM micrograph magnified 400× of a polished cross-section of a layered tri-carbide foam sample. The individual layers of TaC, NbC, and ZrC can be seen. However, because this is a backscattered secondary-electron image (BSE) the inside core of RVC foam skeleton can not be seen (since carbon is a low-Z material, it appears black, as does the central void). The light-colored band is the NbC layer.
Figure 8B:
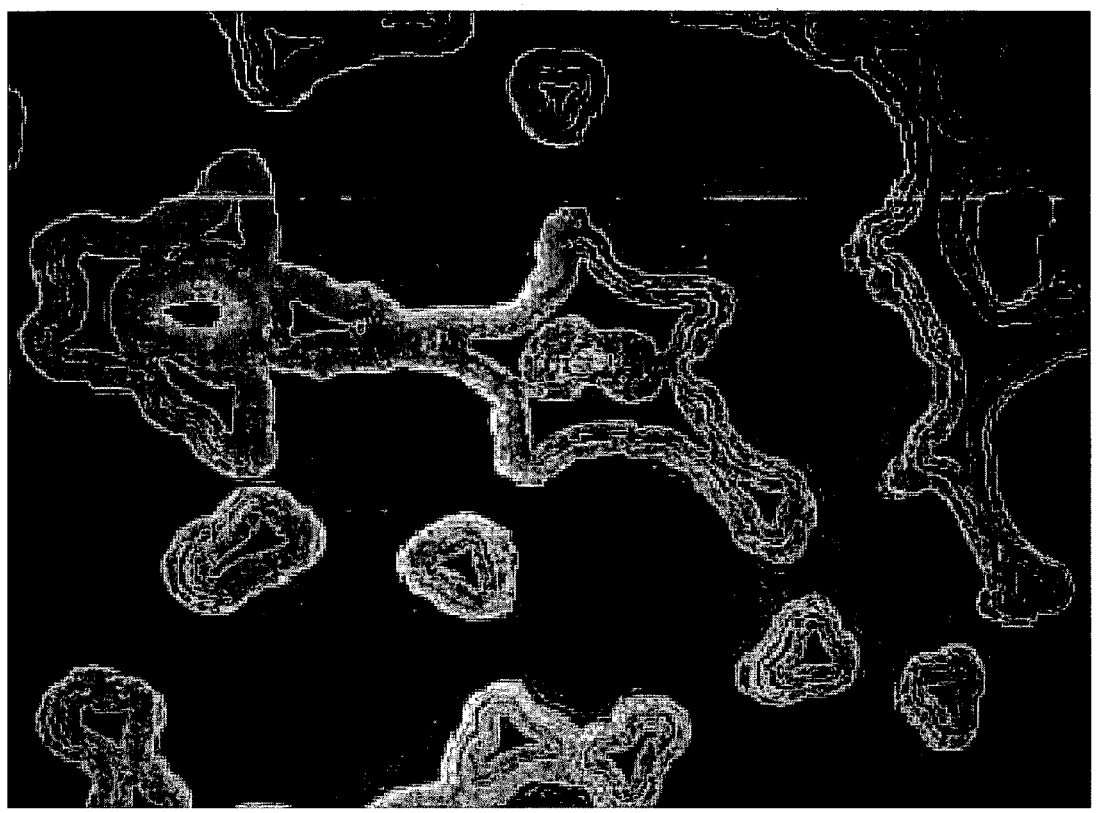
FIG. 8B is an optical micrograph of a polished cross-section of a layered tri-carbide foam sample, magnified 40×. The individual layers of the RVC foam skeleton, TaC, NbC, and ZrC can be seen.

FIG. 8B is an optical micrograph of a polished cross-section of a layered tri-carbide foam sample, magnified 40×. The individual layers of the RVC foam skeleton, TaC, NbC, and ZrC can be seen. TaC was used in this sample as a substitute for UC.

FIG. 8C is a SEM micrograph magnified 400× of a polished cross-section of a layered tri-carbide foam sample. The individual layers of TaC, NbC, and ZrC can be seen. However, because this is a backscattered secondary-electron image (BSE) the inside core of RVC foam skeleton can not be seen (since carbon is a low-Z material, it appears black, as does the empty central void). The light-colored band is the NbC layer. TaC was used in this sample as a substitute for UC.

Figure 9A:
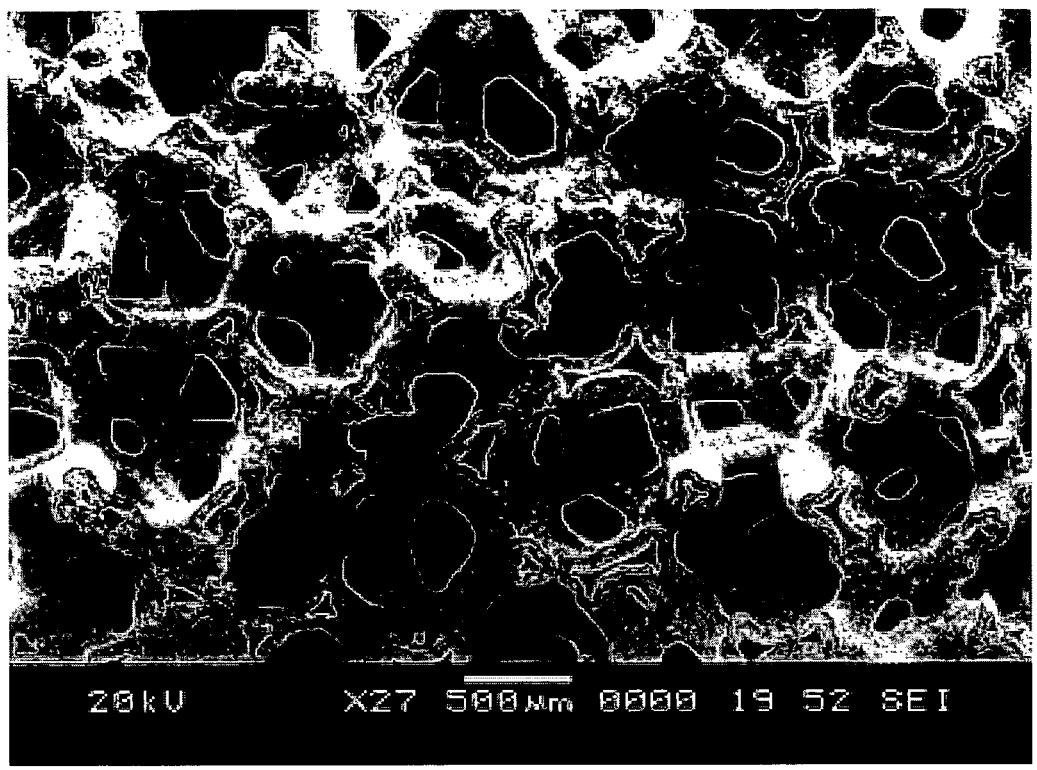
FIG. 9A is a SEM micrograph magnified 27× of a 65-ppi reticulated vitreous carbon (RVC) foam skeleton after being infiltrated with layers of TaC/NbC/ZrC to a total of 10% vol. density. TaC was used in this sample as a substitute for UC.

FIG. 9A is a SEM micrograph magnified 27× of a 65-ppi reticulated vitreous carbon (RVC) foam skeleton after being infiltrated with layers of TaC/NbC/ZrC to a total of 10% vol. density. TaC was used in this sample as a substitute for UC.

Figure 9B:
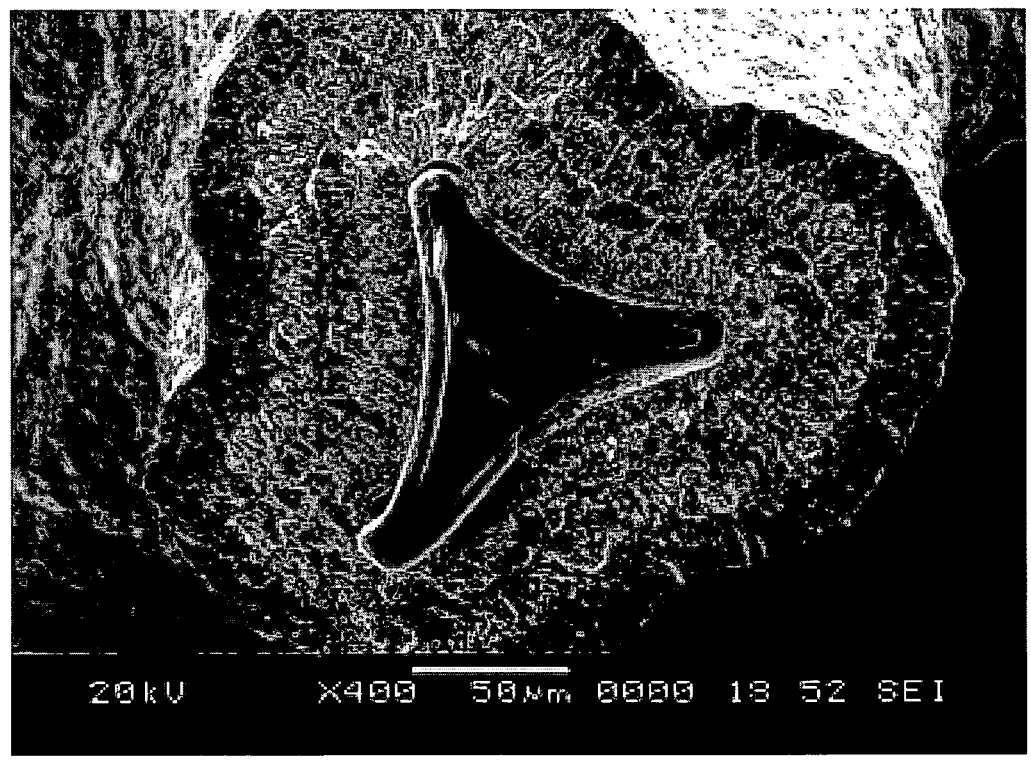
FIG. 9B is a SEM micrograph magnified 400× of a 65-ppi reticulated vitreous carbon (RVC) foam skeleton after being infiltrated with layers of TaC/NbC/ZrC to a total of 10% vol. density. Because this is a backscattered primary-electron image, the inside core of RVC foam skeleton can be easily identified.

FIG. 9B is a SEM micrograph magnified 400× of a 65-ppi reticulated vitreous carbon (RVC) foam skeleton after being infiltrated with layers of TaC/NbC/ZrC to a total of 10% vol. density. Because this is a backscattered primary-electron image, the inside core of RVC foam skeleton can be easily identified.

Figure 10A:
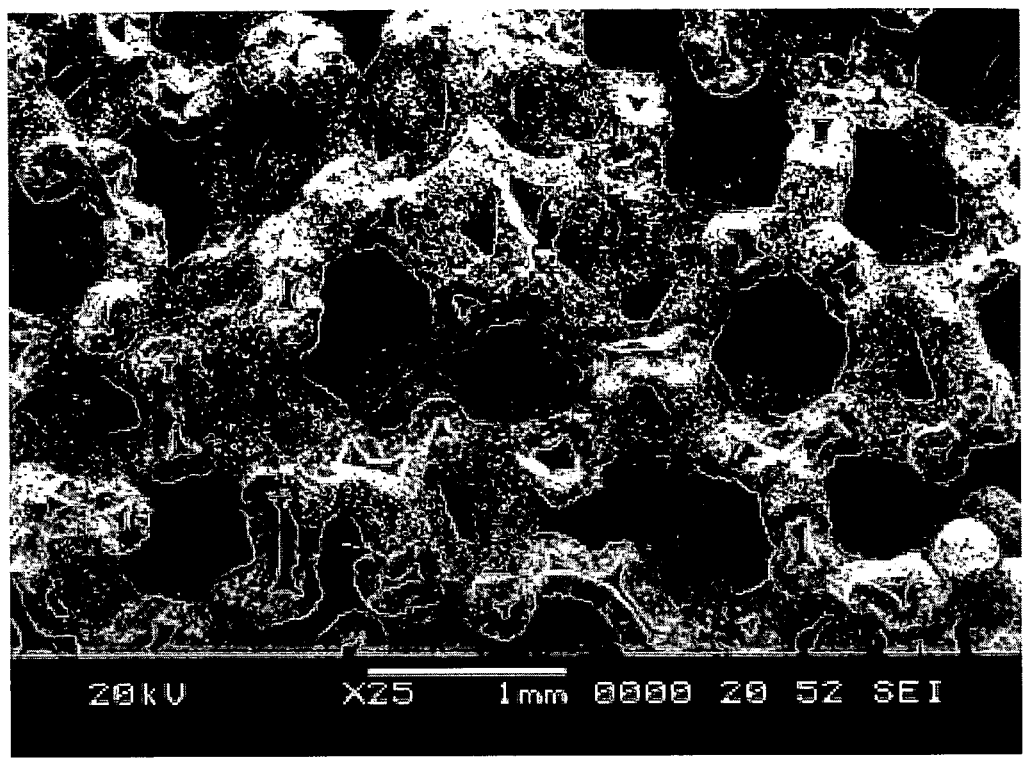
FIG. 10A is a SEM micrograph magnified 27× of a 65-ppi reticulated vitreous carbon (RVC) foam skeleton after being infiltrated with layers of TaC/NbC/ZrC to a total of 30% vol. density.

FIG. 10A is a SEM micrograph magnified 27× of a 65-ppi reticulated vitreous carbon (RVC) foam skeleton after being infiltrated with layers of TaC/NbC/ZrC to a total of 30% vol. density.

Figure 10B:
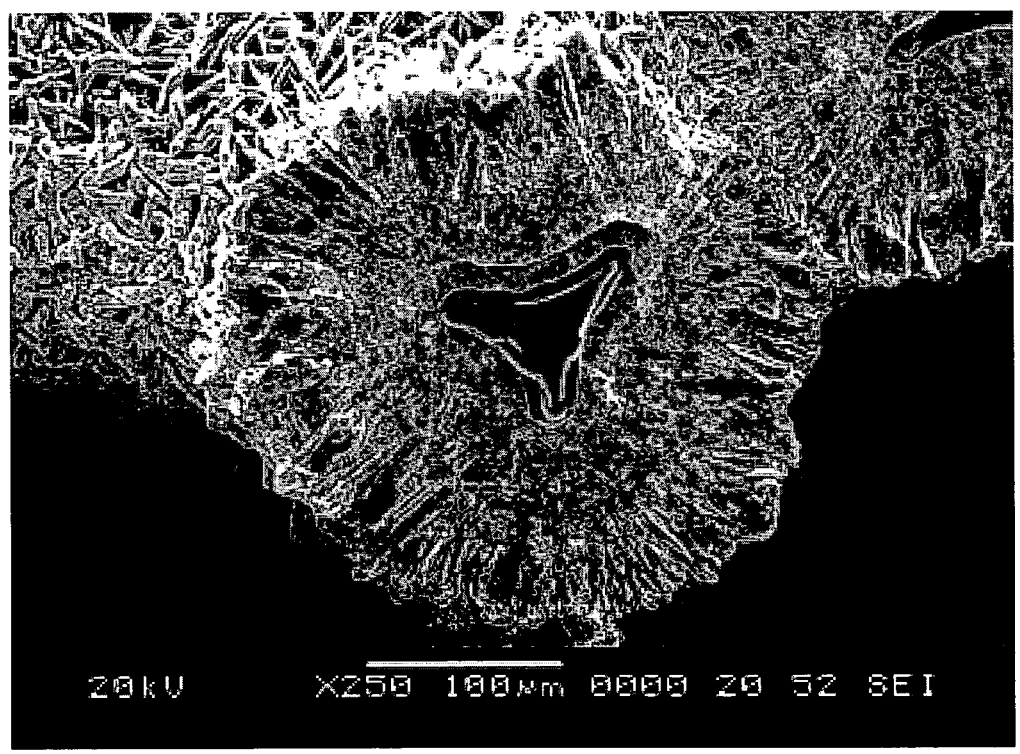
FIG. 10B is a SEM micrograph magnified 400× of a 65-ppi reticulated vitreous carbon (RVC) foam skeleton after being infiltrated with layers of TaC/NbC/ZrC to a total of 30% vol. density.

FIG. 10B is a SEM micrograph magnified 400× of a 65-ppi reticulated vitreous carbon (RVC) foam skeleton after being infiltrated with layers of TaC/NbC/ZrC to a total of 30% vol. density.

Figure 11A:
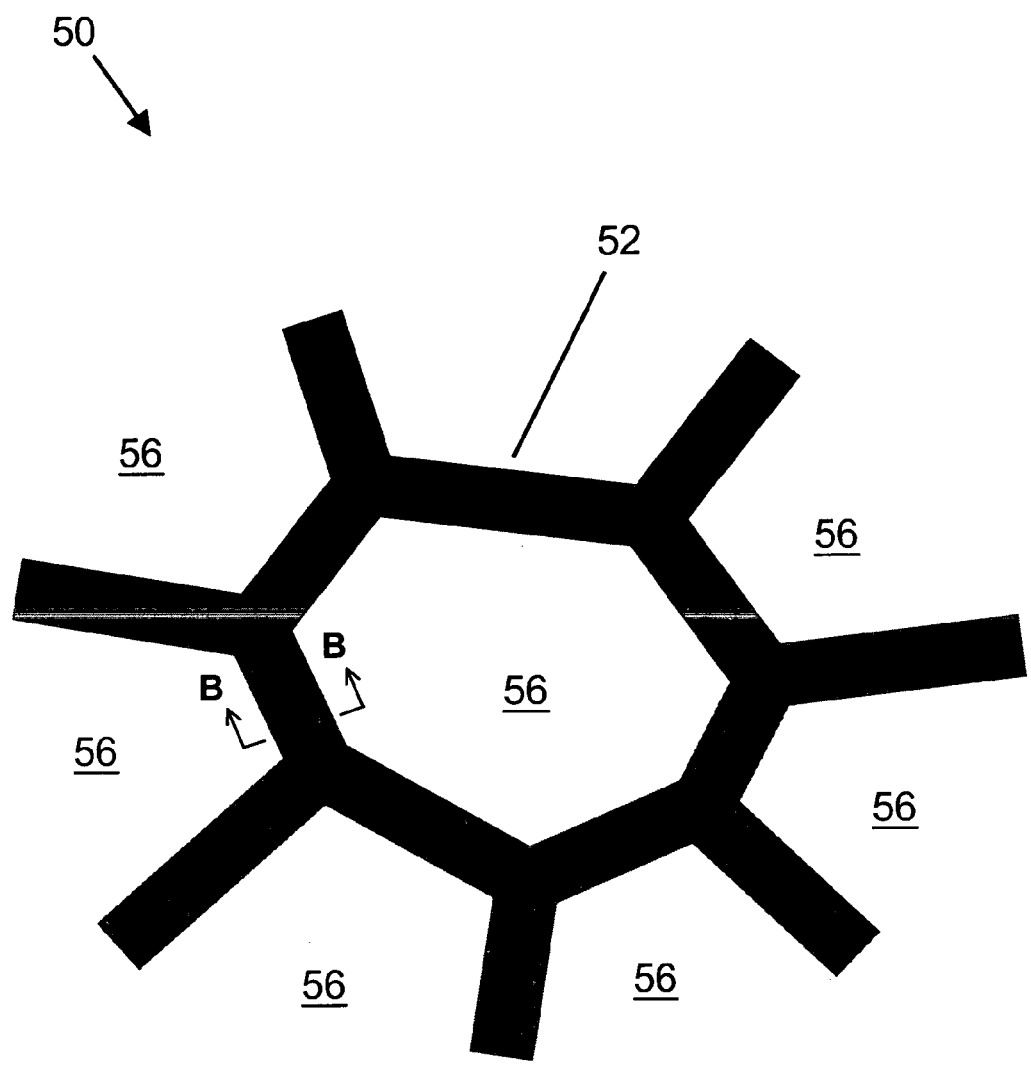
FIG. 11A illustrates a schematic view of an example of a porous nuclear fuel element, where the interconnecting ligaments of the porous body are made of nuclear fuel, according to the present invention.

FIG. 11A illustrates a schematic view of an example of a porous nuclear fuel element 50, where the interconnecting ligaments 52 of the porous body are made of nuclear fuel 52, according to the present invention. Ligaments 52 comprise one or more compounds selected from the group consisting of solid-solution uranium bi-carbides, solid-solution uranium tri-carbides, and solid-solution uranium carbonitrides. Optionally, a barrier coating (not shown), e.g., ZrC, may be applied on top of the nuclear fuel ligament 52.

Figure 11B:
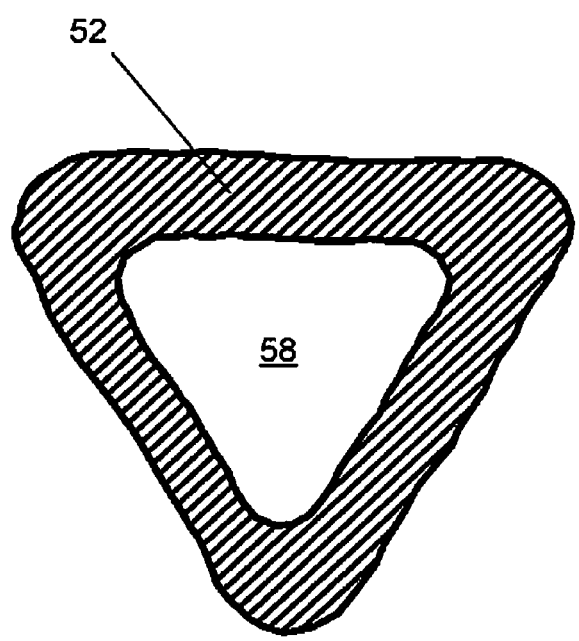
FIG. 11B illustrates a schematic cross-section view, Section B-B, of an example of a hollow, triangular-shaped ligament of a porous body, wherein the ligament is made of nuclear fuel, according to the present invention

FIG. 11B illustrates a schematic cross-section view, Section B-B, of the example of FIG. 11A of a hollow, triangular-shaped ligament 52 (with hollow interior 58) of a porous body, wherein the ligament is primarily made of nuclear fuel, according to the present invention. This structure can be fabricated using the CVI method described above, followed by removal of the RVC foam skeleton by baking in an oxygen or hydrogen-bearing atmosphere. Removal of the internal supporting structure made of carbon (e.g., RVC) can help to improve neutronic performance of fast nuclear reactors by preventing the slowing down of fast neutrons by scattering from low-Z, carbon-bearing underlying structure in the ligaments. Additionally, a barrier coating (not shown), e.g., ZrC, may be applied on top of the nuclear fuel ligament 52.

Figure 12:
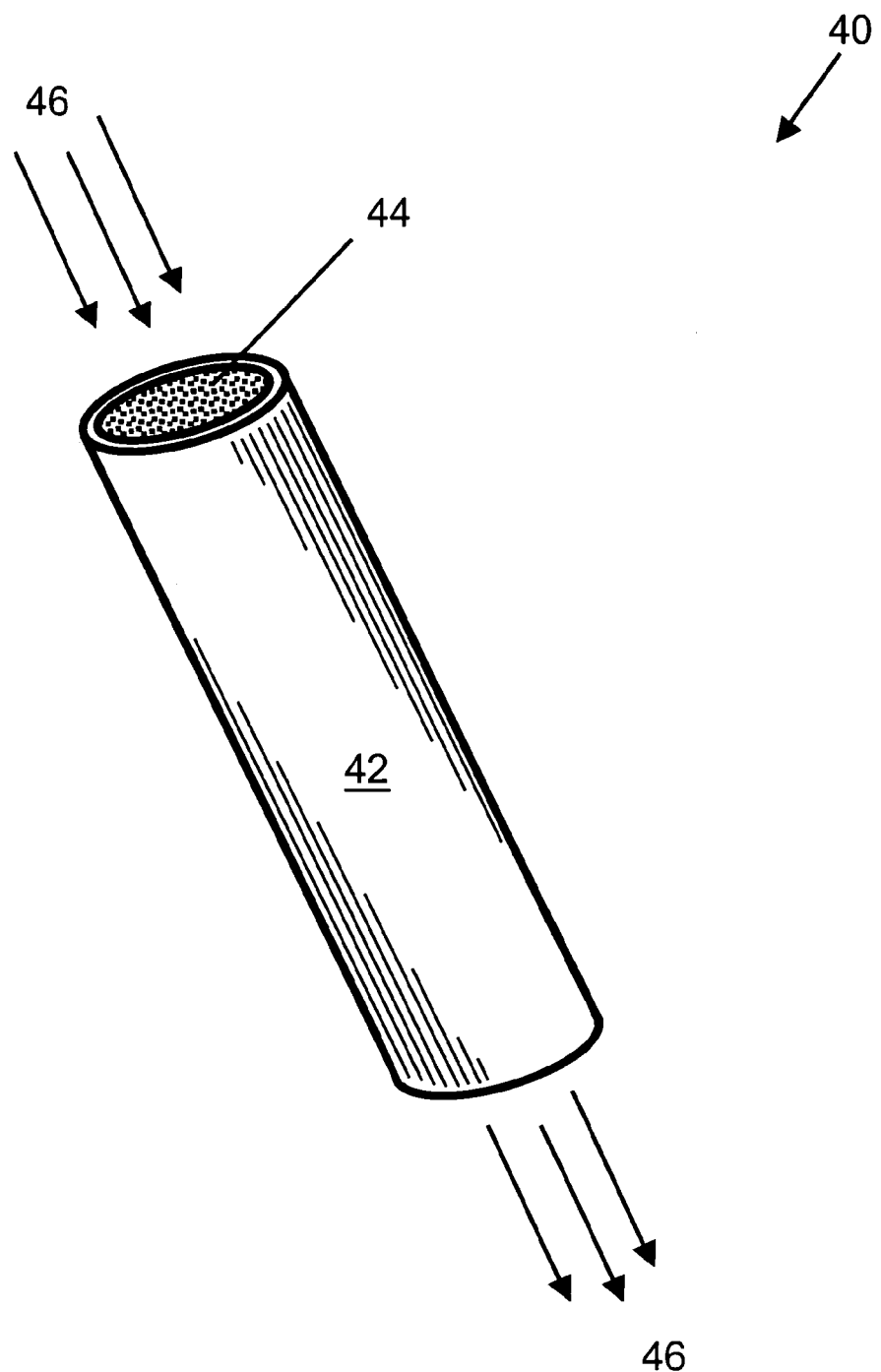
FIG. 12 illustrates a schematic isometric view of an example of a porous nuclear fuel element comprising porous nuclear fuel encased within a cylinder of metal cladding, according to the present invention.

FIG. 12 illustrates a schematic isometric view of an example of a nuclear fuel element 40 comprising porous nuclear fuel 44 encased within metal cladding 42, according to the present invention. Gas coolant 46 flows through the gas-permeable, porous nuclear fuel 44, exchanging heat with a high heat transfer efficiency from the high-porosity nuclear fuel, due to the large extended surface area of the porous fuel, and at a high temperature due to the thinness of the nuclear fuel itself.

Referring still to FIG. 12, the composition of the porous nuclear fuel 44 encased within cladding 42 may vary along the length of the element 40. This axial variation in composition or porosity can be achieved by varying the foam skeleton properties and/or the amount or type of fuel infiltrated along the length. Additionally, neutron absorbers made of HfC and/or $B_4C$ may be added to the nuclear fuel 44, for example, by a similar CVI process, to provide control of the neutron profile, for example, along the length of cylinder 42. Shapes of the metal cladding 42 other than cylindrical may be used, such as a oval, square, or hexagonal shape, as is well known in the art.

Figure 13:
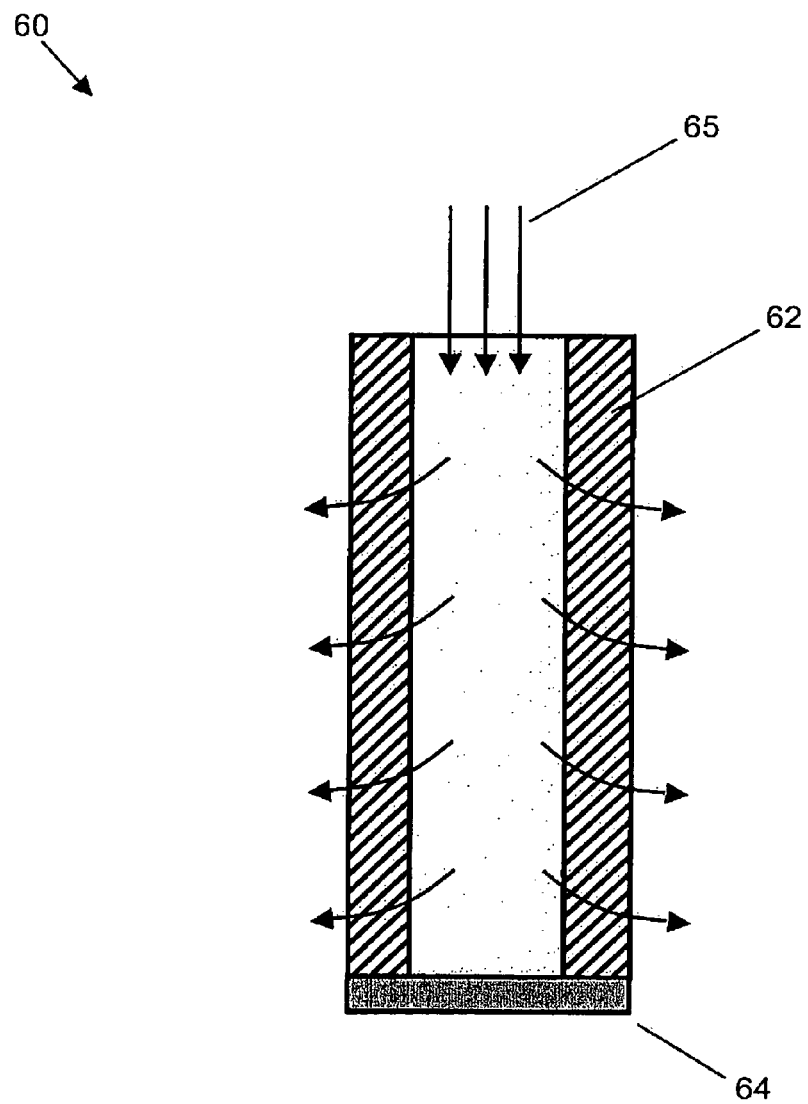
FIG. 13 illustrates a schematic cross-section view of an example of an annular porous nuclear fuel element in the shape of a thick-walled cylinder, having a closed end, where gas cooling enters through the open central core and exits by flowing radially inwards or outwards through the porous fuel.

FIG. 13 illustrates a schematic cross-section view of an example of an annular porous nuclear fuel element 60 in the shape of a thick-walled cylinder 62, having a closed end 64, where gas cooling 65 enters through the open central core and exits by flowing radially outwards through the porous fuel 62.

Experimental Flow and Heat Transfer Tests

Six, layered TaC/NbC/ZrC foam specimens were fabricated and delivered to Sandia for flow test experiments. All were 65-ppi foam cylinders of nominal dimensions 1.5" ID by 2.0" OD by 2.5" long, with tri-carbide densities of 15%, 17%, 22%, 26%, 3%4, and 42% by volume, respectfully. In each case, the composition of the layered carbide coating was very close to a target of 18 vol % TaC/41 vol % ZrC/41 vol % NbC (using tantalum as a surrogate for uranium).

Three of the six prototype foam modules supplied by Ultramet Inc. were tested at Sandia's Plasma Materials Test Facility. Flow testing was performed on the 85%, 78% and 54% porosity modules. Helium mass flows from 0 to 35 g/s were used at an absolute background pressure of 4 MPa to characterize the pressure drop across the 6 mm thick foam using radial flow. The test results demonstrate that both the 85% and 78% porosity foams have an extremely low pressure drop, less than 350 Pa (<0.05 psia), at the highest mass flows (28 g/s) obtainable on the helium flow loop. As expected, the highest density foam had the largest pressure drop of 24 kPa (<3.5 psia) at 27 g/s of mass flow. The 85% and 78% porosity foams could be used in either radial flow for a NEP application or axial flow for an NTP application; or a combination of the two geometries is possible for a hybrid, bi-modal application.

Thermal test data were obtained on the two modules of most interest, 85% and 78% porosity. The modules were ohmically heated to between 200 and 300° C. with no helium flow. After a steady state temperature was achieved across the module, a constant helium flow rate of 0.9 g/s was quickly started and the foam thermocouple responses were tracked during the cooldown. Since the mass of the foam was known, as well as the specific heat of the tricarbide (0.329 J/gC) it was easy to determine the power loss during cooldown. Approximately 524 W was removed from the 85% module and 585 W from the 78% module during the first few seconds of the cooldown. Here, the conductive losses to the support structure are small, and radiation losses are negligible. The slope of each cooldown curve provides a useful estimate of the effective convective heat transfer coefficient, $h_{eff}$. Values of 489 $W/m^2 K$ and 627 $W/m^2 K$ were obtained for the 85% and 78% porous modules. The area to volume ratio for 65 ppi foam is approximately 5100 $m^2/m^3$ for the 85% porosity foam and 7100 m²/m³ for the 78% porosity foam. The average effective $h_{eff}$ is, hence, a factor of 28 and 40 above that of a smooth tube of similar dimensions or an equivalent channel in a pin-type core geometry.

The thermal tests revealed that the 78% porosity foam performed better than the 85% material. This is mostly attributable to the higher surface-to-volume ratio. Yet, the penalty in additional pressure drop was minuscule. The higher density foam also has an advantage in allowing for the use of more fissile material at lower enrichments than the 85% porous foam. Computational fluid dynamics (CFD) modeling revealed that an 87% porous foam would have only slightly better heat transfer than a 77% case using a ligament thermal conductivity of 25 W/mK. The calculated variation in thermal performance using two different thermal conductivities in the ligaments was shown previously. As the ligament conductivity, k, increases to 50 W/mK, the 85% foam begins to show better performance than the 77% foam. However, for the k=23 W/mK ligaments in these tricarbide prototypes, the higher thermal mass and surface area of the 77% porosity foam had a slightly greater effect in the experiment than the models predicted. It is clear, however, that the thermal performance between the 77% and 85% porous foam is very similar and either would be a good candidate for continued development. For space applications, cores of compact size and high power density are preferred to minimize mass, and this pushes the design to higher density foams than thermal efficiency alone might dictate.

These initial experiments have established the feasibility of using a tri-carbide foam material for space nuclear reactor applications. Thermal modeling of the foam at Sandia indicated a substantial improvement in heat transfer between the high surface area foam fuel and the coolant relative to the high delta-T present between the fuel centerline and coolant in pin-type fuels. The overall efficiency of the heat transfer was shown to increase dramatically as the thermal conductivity of the tri-carbide ligaments is increased from 25 W/mK to 50 W/mK, a level that is clearly achievable at a 2700 C operating temperature. A porosity range of between 77% and 85% was identified as optimal during initial modeling work and was supported by the results of experimental testing.

Calculations indicate that either a small highly enriched core can be assembled that can operate at high power for brief times as required for thermal propulsion; or, a very large core of low enriched fuel can be made that can operate at low power for very long durations as required for electric propulsion systems. The results of a reactor scooping study showed that even 80% porous foams with modest fissile enrichments (~20%) produce sizes that are reasonable for space applications.

In summary, a matrix of six, layered tri-carbide foam thermal/gas flow test specimens were fabricated, demonstrating the ability to tailor the foam density to meet application requirements. Compression testing of foam before and after 2500 C hydrogen exposure for 60 minutes confirmed both the high strength of the foam, as well as the retention of strength following hot hydrogen exposure.

Helium flow testing performed at Sandia demonstrated the extremely low pressure drop across the highly porous foam structures, and porosity levels were identified (78-85% porous) that could be used in either radial flow for a NEP application or axial flow for an NTP application; or a combination of the two geometries is possible for a hybrid, bi-modal application. The results of thermal testing revealed that foam in the lower end of this porosity range performed better because of the higher surface-to-volume ratio, and the higher density foam also has an advantage in allowing for the use of more fissile material at lower enrichments.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A nuclear fuel element, comprising a porous, open-celled, foam material comprising
   a three-dimensional, reticulated network of interconnected hollow tubular structural ligaments, with interconnected pores disposed throughout the network in-between the ligaments;
   wherein each hollow tubular ligament comprises:
      a continuous ceramic shell made of a uranium tri-carbide nuclear fuel alloy, and
      a hollow, empty central core space disposed inside of the shell substantially along the entire length of the ligament;
   wherein the alloy comprises a solid-solution alloy of UC, ZrC, and XC, where X is selected from the group consisting of Nb, Ta, Hf and W;
   wherein the nuclear fuel element has a total porosity greater than or equal to about 70%; and
   wherein no underlying reticulated vitreous carbon foam skeleton exists inside of the ligaments.

2. The fuel element of claim 1, wherein the structural ligaments have a triangular-shaped cross-section.

3. The fuel element of claim 1, wherein X is Nb.

4. The fuel element of claim 1, wherein the uranium metal mole fraction in the solid-solution alloy is less than or equal to 10%.

5. The fuel element of claim 1, further comprising a ZrC barrier coating covering the external surface of each ligament.

6. The fuel element of claim 1, wherein the uranium tri-carbide solid-solution alloy has a stoichiometry equal to $(U_W Zr_X Nb_Y)C_Z$; wherein:
   $0.04 < W < 0.12$,
   $0.45 < X < 0.90$,
   $0.00 < Y \leq 0.45$, and
   $0.92 < Z < 1.00$.

7. The fuel element of claim 6, wherein the uranium tri-carbide alloy has a stoichiometry equal to $(U_{0.1} Zr_{0.77} Nb_{0.13})C_{0.95}$.

8. The fuel element of claim 6, wherein the uranium tri-carbide alloy has a stoichiometry equal to $(U_{0.1} Zr_{0.675} Nb_{0.225})C$.

* * * * *